(12) United States Patent
Inamoto et al.

(10) Patent No.: US 7,245,812 B2
(45) Date of Patent: Jul. 17, 2007

(54) STRUCTURE FOR CONNECTING OPTICAL FIBER

(75) Inventors: Takashi Inamoto, Nagoya (JP); Hiroyuki Takahashi, Nishikamo-gun (JP); Ryotaro Kachu, Nishikamo-gun (JP); Yujiro Miyata, Kariya (JP); Motomi Iyoda, Seto (JP)

(73) Assignee: DENSO Corporation, Kariya (JP)

( * ) Notice: Subject to any disclaimer, the term of this patent is extended or adjusted under 35 U.S.C. 154(b) by 28 days.

(21) Appl. No.: 11/019,263

(22) Filed: Dec. 23, 2004

(65) Prior Publication Data
US 2005/0185913 A1 Aug. 25, 2005

(30) Foreign Application Priority Data
Feb. 24, 2004 (JP) .............................. 2004-048496

(51) Int. Cl.
*G02B 6/00* (2006.01)
(52) U.S. Cl. ...................................... 385/138; 385/134
(58) Field of Classification Search ................ 385/134, 385/138
See application file for complete search history.

(56) References Cited

U.S. PATENT DOCUMENTS 4,844,570 A * 7/1989 Tanabe ......................... 385/60
5,151,967 A   9/1992 Ebinuma
5,778,122 A * 7/1998 Giebel et al. .................. 385/55
6,792,181 B2 * 9/2004 Sasaki ........................... 385/37

FOREIGN PATENT DOCUMENTS

| JP | A-H07-190732 | 7/1995 |
| JP | A-2001-13366 | 1/2001 |
| JP | A-2002-236005 | 8/2002 |

OTHER PUBLICATIONS

Office Action and its translation in corresponding Chinese application No. 200510050970.3 dated Nov. 10, 2006.

* cited by examiner

Primary Examiner—Jennifer Doan
(74) Attorney, Agent, or Firm—Posz Law Group, PLC

(57) ABSTRACT

An optical fiber is optically coupled to a light-receiving/emitting element contained in an interface box. The coupling structure is composed of a cylindrical ferule water-tightly inserted into a through-hole formed in a wall of the interface box, a resilient grommet coupled to the ferule and a coupler having the light-receiving/emitting element. An optical fiber is inserted into coaxially formed center holes of the ferule and the grommet, and an axial end of the optical fiber is exposed at an axial end of the ferule. The coupler is coupled to the ferule so that the light-receiving/emitting element directly faces the exposed end of the optical fiber to establish an optical connection at a minimized connection loss.

5 Claims, 2 Drawing Sheets

STRUCTURE FOR CONNECTING OPTICAL FIBER

CROSS-REFERENCE TO RELATED APPLICATION

This application is based upon and claims benefit of priority of Japanese Patent Application No. 2004-48496 filed on Feb. 24, 2004, the content of which is incorporated herein by reference.

BACKGROUND OF THE INVENTION

1. Field of the Invention

The present invention relates to a structure for connecting an optical fiber to an interface box having a light receiving/emitting element.

2. Description of Related Art

Recently, an optical fiber is used for various purposes, e.g., as a transmitting line in a communication system or as a load sensor in a collision detecting system in an automobile. JP-A-07-190732 discloses a device for detecting an automobile collision using an optical fiber as a sensor. In this detecting device, an optical fiber is disposed along a front bumper, and one end of the optical fiber is optically connected to a light-emitting element and the other end is connected to a light-receiving unit. When the vehicle collides with another vehicle or an obstacle, the optical fiber may be broken or damaged, thereby reducing an amount of light being transmitted through the optical fiber. The collision is detected based on the amount of light received by the light-receiving unit.

An example of a device in which the optical fiber is used as a sensor for detecting a strain in a resilient rubber member is disclosed in JP-A-2002-236005. An elongate sensor having an optical fiber therein is embedded in the rubber member. An amount of load applied to the resilient rubber member is detected based on the strain detected by the sensor having the optical fiber. Since a light-transmitting phase in the optical fiber changes according to a strain, an amount of strain can be detected by detecting the changes in the light phase, using a light interference detector such as an optical fiber ring detector.

An optical fiber is composed of a core member and a clad member disposed around the core member. When the optical fiber is optically connected to another piece of the optical fiber or to a light-receiving and/or emitting element, it is important to avoid mismatching of light-emitting/receiving angle relative to the fiber axis (an angle θ between a light-emitting/receiving direction and the center axis of the optical fiber) at a point of optical connection. This is because a loss in light transmission occurs if there is mismatching.

An example of a structure for connecting an optical fiber to a light-receiving/emitting element is disclosed in JP-A-2001-013366. In this structure, a ferule in which an optical fiber is disposed is telescopically inserted into a receptacle having a light-receiving/emitting element therein. By telescopically inserting the ferule into the receptacle, mismatching of the light angles at the connecting point is minimized, thereby attaining an optical connection at low connection loss. The ferule further includes a door for protecting an exposed end of the optical fiber. The door is spring-biased and is opened only when the ferule is inserted into the receptacle and positioned to face the light-receiving/emitting element. The door is closed at other times thereby protecting the exposed end of the optical fiber.

The connecting structure disclosed in JP-A-2001-013366, however, is mostly intended for use in connection on a printed circuit board. In the case where an optical fiber connecting structure is used in an automobile, the connecting structure is always subjected to high vibration and possible water immersion. Therefore, it is necessary to provide the optical fiber connecting structure with strength against the vibration and water immersion when the connecting structure is used in an automobile.

SUMMARY OF THE INVENTION

The present invention has been made in view of the above-mentioned problem, and an object of the present invention is to provide an improved structure for connecting an optical fiber to a light-receiving/emitting element, wherein the connecting structure has strength against vibration and water immersion, and the optical fiber is easily connected to the light-receiving/emitting element at a low connection loss.

A cylindrical ferule made of resin is inserted into a through-hole formed in a wall of an interface box containing a light-receiving/emitting element and other components therein. The ferule is connected to the through-hole not to rotate therein and not to move in the axial direction by a stopper member disposed between an outer periphery of the ferule and the through-hole. A first center hole through which an optical fiber is inserted is formed in the ferule. A grommet having a second center hole made of a resilient material such as thermoplastic elastomer is connected to the ferule so that the second center hole is coaxially positioned with the first center hole.

An optical fiber is inserted into the grommet and the ferule through the respective center holes, the second and the first center holes, so that an axial end surface of the optical fiber exposes at the axial end of the first center hole. Sealing member such as one or more O-rings made of a resilient material is disposed in a small gap between the outer periphery of the ferule and the though-hole so that the ferule is liquid-tightly connected to the through-hole.

After the ferule is connected to the through-hole and the optical fiber is inserted into the ferule together with the grommet, a coupler having the light-receiving/emitting element therein is coupled to the ferule at an inside of the interface box. The ferule and the coupler are coupled by inserting a coupling projection extending from the ferule into a coupling hole formed in the coupler. The axial end of the optical fiber exposing at the axial end of the first center hole directly faces the light-receiving/emitting element of the coupler.

Since the coupler is connected to the ferule by coupling the coaxially formed coupling projection and the coupling hole, the optical fiber is optically connected to the light-receiving/emitting element at a low connection loss. Since vibration imposed on the ferule is absorbed by the resilient grommet and the sealing member, the optical connection between the optical fiber and the light-receiving/emitting element is correctly maintained, and the connection loss is kept at a low level. Since the ferule is water-tightly connected to the wall of the interface box and the optical fiber is water-tightly held by the grommet, water immersion into the interface box is surely prevented.

Other objects and features of the present invention will become more readily apparent from a better understanding of the preferred embodiment described below with reference to the following drawings.

DETAILED DESCRIPTION OF THE PREFERRED EMBODIMENT

Figure 1:
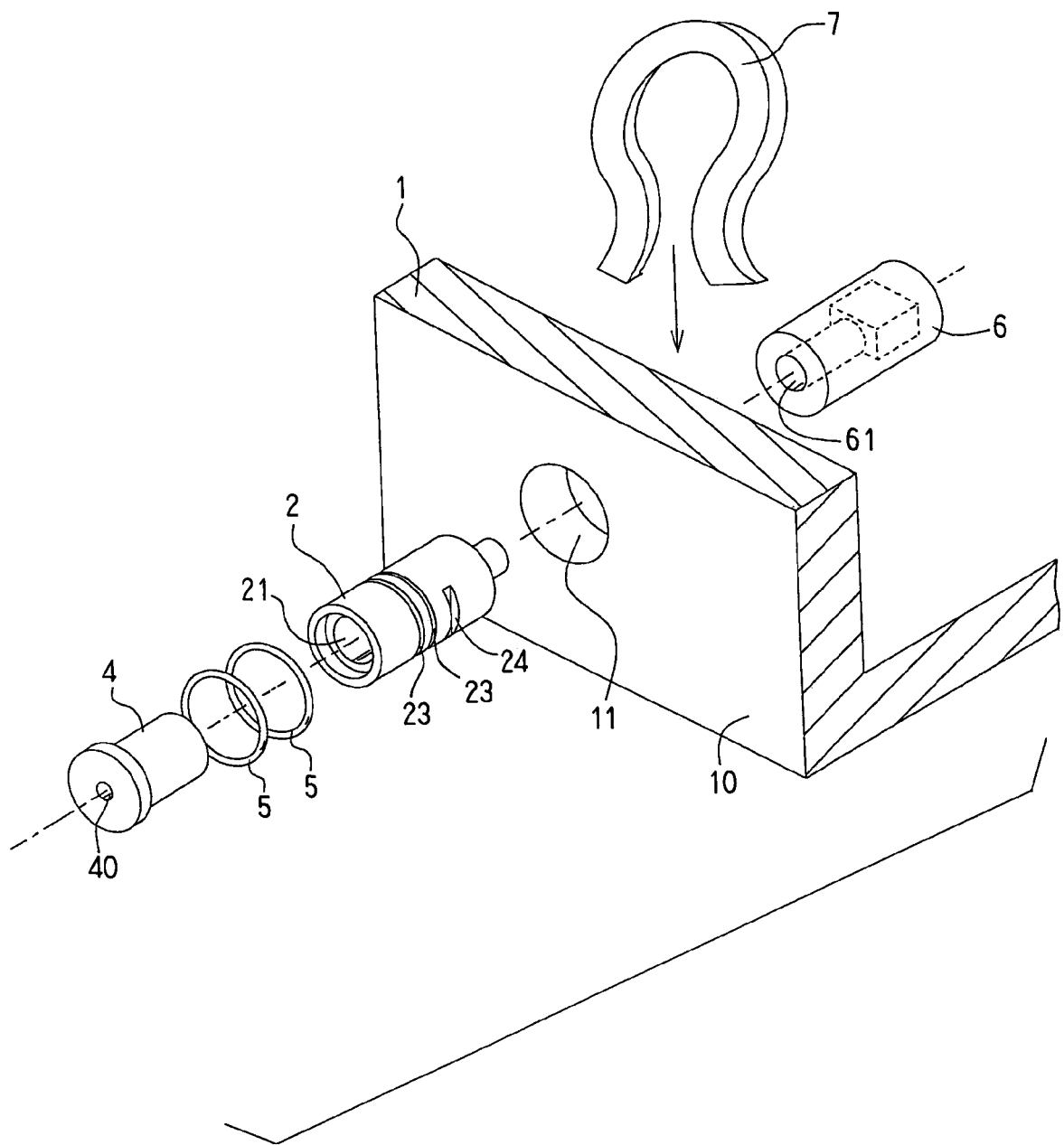
FIG. 1 is a perspective view showing a structure for connecting an optical fiber to a light-receiving/emitting element contained in an interface box.
Figure 2:
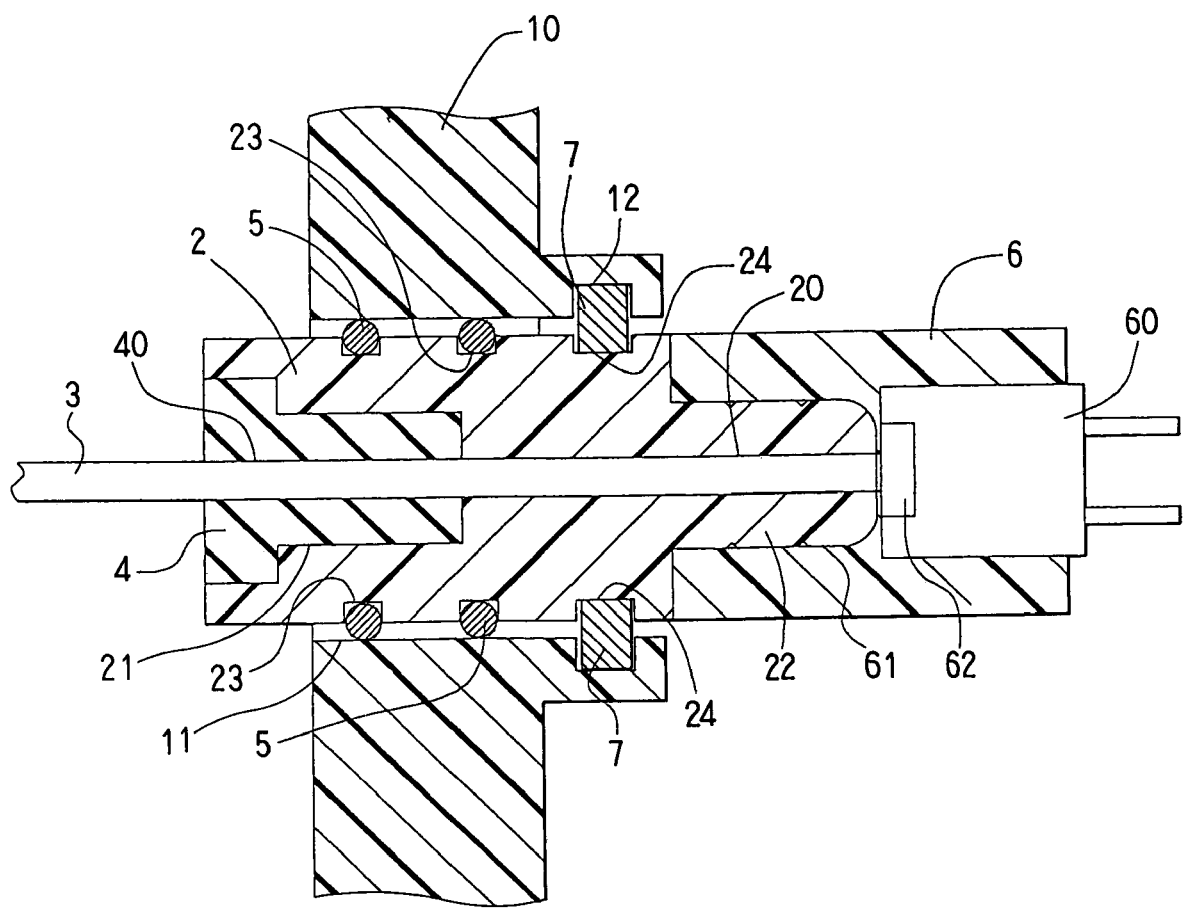
FIG. 2 is a cross-sectional view showing the connecting structure shown in FIG. 1.

A preferred embodiment of the present invention will be described with reference to FIGS. 1 and 2. A ferule 2, in which an optical fiber 3 is inserted, is held in a through-hole 11 formed through a wall 10 of an interface box 1. After the ferule 2 is fixed to the wall 10 of the interface box 1, a coupler 6 having an light-receiving/emitting element 60 is coupled to the ferule 2 from the inside of the interface box 1. As shown in FIG. 2, a pair of guide rails 12 is formed on the inside surface of the wall 10, and the ferule 2 is connected to the wall 10 by a stopper member such as a resilient clip 7 held in the guide rails 12.

The ferule 2 is made of a resin material, and formed in a cylindrical shape having a stepped depression 21 formed at one end (referred to as a front end) and a coupling projection 22 formed at the other end (referred to as a rear end). In the center of the ferule 2, a first center hole 20 through which the optical fiber 3 is inserted is formed. A grommet 4 made of a resilient material such as thermoplastic elastomer is press-fitted in the stepped depression 21. A second center hole 40 through which the optical fiber 3 is forcibly inserted is formed in the center of the grommet 4. The grommet 4 is connected to the ferule 2 so that the second center hole 40 is coaxially positioned with the first center hole 20 of the ferule 2.

A pair of grooves 23, in each of which a sealing member such as an O-ring 5 is positioned, and another groove 24, in which the clip 7 is held, are formed on the outer periphery of the ferule 2. The grommet 4 is press-fitted in the stepped depression 21 of the ferule 2, so that both are connected liquid-tightly and the optical fiber 3 inserted into the second center hole 40 is liquid-tightly held therein.

The coupler 6 is made of a resin material and formed in a cylindrical shape having a coupling hole 61 at the front side and a light-receiving/emitting element 60 held at the rear side. The light-receiving/emitting element 60 includes a front portion 62 that faces an axial end of the optical fiber 3 inserted into the first center hole 20 of the ferule 2. The coupler 6 is coupled to the ferule 2 by inserting the coupling portion 22 of the ferule 2 into the coupling hole 61 of the coupler 6. Thus, the axial end of the optical fiber 3 correctly faces the front portion 62 of light-receiving/emitting element 60. The light-receiving/emitting element 60 may be a light-receiving element such as a photo-diode, a light-emitting element such as an LED or a laser element, or an element that performs both functions (light-receiving and light-emitting).

The ferule 2 is connected to the through-hole 11 of the wall 10 by the clip 7 made of a resilient metallic material not to rotate in the through-hole 11 and not to move in the axial direction. A small gap between the through-hole 11 and the outer periphery of the ferule 2 is liquid-tightly sealed by the pair of O-rings 5. The O-ring 5 may be made of rubber or thermoplastic elastomer.

The above-described components forming the connecting structure are assembled in the following manner. First, the optical fiber 3 is forcibly inserted into the second center hole 40 of the grommet 4, so that a predetermined length of the optical fiber 3 extends to the rear side of the grommet 4. Then, the portion of the optical fiber 3 extending from the grommet 4 is inserted into the first center hole 20 of the ferule 2, and at the same time the grommet 4 is press-fitted in the stepped depression 21 of the ferule 2. Since the first center hole 20 and the second center hole 40 are formed so that both are coaxially positioned, the optical fiber 3 extends straight through both center holes 20, 40. The optical fiber 3 is liquid-tightly held in the grommet 4, and the grommet 4 is liquid-tightly held in the ferule 2.

Then, the pair of O-rings 5 is disposed in the grooves 23 formed on the outer periphery of the ferule 2, and the ferule 2 is forcibly inserted into the through-hole 11 from the front side thereof. Then, the clip 7 having an opening is engaged in a space formed by the guide rail 12 and the groove 24. Thus, the ferule 2 is fixed to the wall 10 of the interface box 1, so that the ferule 2 does not rotate in the through-hole 11 and does move in the axial direction. After the ferule 2 is fixed to the wall 10, the coupler 6 is coupled to the ferule 2 by forcibly inserting the coupling portion 22 of the ferule 2 into the coupling hole 61 of the coupler 6. Thus, the axial end of the optical fiber 3 exposed to the rear end of the ferule 2 correctly faces the front portion 62 of the light-receiving/emitting element 60.

The following advantages are attained in the connecting structure described above. Since the ferule 2 and the coupler 6 are coupled to each other so that the axial end of the optical fiber 3 squarely faces the front portion 62 of the light-receiving/emitting element 60, the connection loss is minimized. Since the vibration is absorbed by the resiliency of the grommet 4 and the sealing member 5 if the coupling structure is subjected to the vibration, the light axis of the optical fiber 3 is prevented from being shifted from the light axis of the light-receiving/emitting element 60. Therefore, the coupling structure according to the present invention is advantageously used not only in an automobile but in other devices which are subjected to vibration. Further, water-immersion into the interface box 1 is surely prevented by the grommet 4 and the O-rings 5. Since the coupler 6 is coupled to the ferule 2 by inserting the coupling portion 22 into the coupling hole 61, the connecting process is easy and simple.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A structure for connecting an optical fiber to an interface box having a wall through which a through-hole is formed, the structure comprising:

a ferule having a first center hole through which an optical fiber is inserted, the ferule being held in the through-hole of the wall;

a grommet having a second center hole through which the optical fiber is liquid-tightly inserted, the grommet being fixedly connected to the ferule so that the second center hole is coaxially positioned with the first center hole;

a stopper member for fixing the ferule to the through-hole, the stopper member being engaged in a space defined by a guide rail formed on an inside surface of the wall and in a groove formed on an outer periphery of the ferule so that the ferule does not rotate relative to the through-hole and does not move in the axial direction of the optical fiber;

a sealing member for liquid-tightly fixing the ferule to the through-hole; and a coupler having a light-receiving/emitting element, the coupler being positioned in the interface box and coupled to the ferule so that an axial end of the optical fiber inserted into the first center hole of the ferule directly faces the light-receiving/emitting element.

2. The connecting structure as in claim 1, wherein the sealing member is composed of one or more O-rings.

3. A structure for connecting an optical fiber to an interface box having a wall through which a through-hole is formed, the structure comprising:

a ferule having a first center hole through which an optical fiber is inserted and being positioned in the through-hole of the wall; and a stopper member for fixing the ferule within the through-hole and being engaged in a groove formed on an outer periphery of the ferule so that the ferule does not rotate relative to the through-hole and does not move in an axial direction of the optical fiber, wherein, the stopper member is also engaged in a space defined by a guide rail formed on an inside surface of the wall so that the ferule does not rotate relative to the through-hole and does not move in the axial direction of the optical fiber.

4. A structure for connecting an optical fiber to an interface box having a wall through which a through-hole is formed, the structure comprising:

a ferule having a first center hole through which an optical fiber is inserted and being positioned in the through-hole of the wall;

a stopper member for fixing the ferule within the through-hole and being engaged in a groove formed on an outer periphery of the ferule so that the ferule does not rotate relative to the through-hole and does not move in an axial direction of the optical fiber;

a grommet having a second center hole through which the optical fiber is liquid-tightly inserted, the grommet being fixedly connected to the ferule so that the second center hole is coaxially positioned with the first center hole;

a sealing member for liquid-tightly fixing the ferule to the through-hole; and a coupler having a light-receiving/emitting element, the coupler being positioned in the interface box and coupled to the ferule so that an axial end of the optical fiber inserted into the first center hole of the ferule directly faces the light-receiving/emitting element.

5. A structure for connecting an optical fiber to an interface box having a wall through which a through-hole is formed, the structure comprising:

a ferule having a first center hole through which an optical fiber is inserted and being positioned in the through-hole of the wall;

a stopper member for fixing the ferule within the through-hole by being engaged in a space defined by a guide rail formed on an inside surface of the wall so that the ferule does not rotate relative to the through-hole and does not move in an axial direction of the optical fiber, wherein the stopper member is also engaged in a groove formed on an outer periphery of the ferule so that the ferule does not rotate relative to the through-hole and does not move in the axial direction of the optical fiber.

* * * * *

UNITED STATES PATENT AND TRADEMARK OFFICE
CERTIFICATE OF CORRECTION

PATENT NO. : 7,245,812 B2 Page 1 of 1
APPLICATION NO. : 11/019263
DATED : July 17, 2007
INVENTOR(S) : Takashi Inamoto et al.

It is certified that error appears in the above-identified patent and that said Letters Patent is hereby corrected as shown below:

Title Page, Item (73) Assignee: should read as follows:

DENSO CORPORATION, Kariya (JP)
    TOYOTA JIDOSHA KABUSHIKI KAISHA, Toyota (JP)

Signed and Sealed this

Twenty-ninth Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,245,812 B2  
APPLICATION NO. : 11/019263  
DATED : July 17, 2007  
INVENTOR(S) : Takashi Inamoto et al.

It is certified that error appears in the above-identified patent and that said Letters Patent is hereby corrected as shown below:

Title Page  
Change Assignee (item 73) to read as:

(73) Assignees:

DENSO CORPORATION, Kariya (JP)  
TOYOTA JIDOSHA KABUSHIKI KAISHA, Toyota (JP)

Signed and Sealed this

Twentieth Day of May, 2008

JON W. DUDAS  
*Director of the United States Patent and Trademark Office*